Nov. 23, 1965 R. BERRY 3,219,414
PURIFICATION OF HELIUM
Filed Sept. 6, 1961
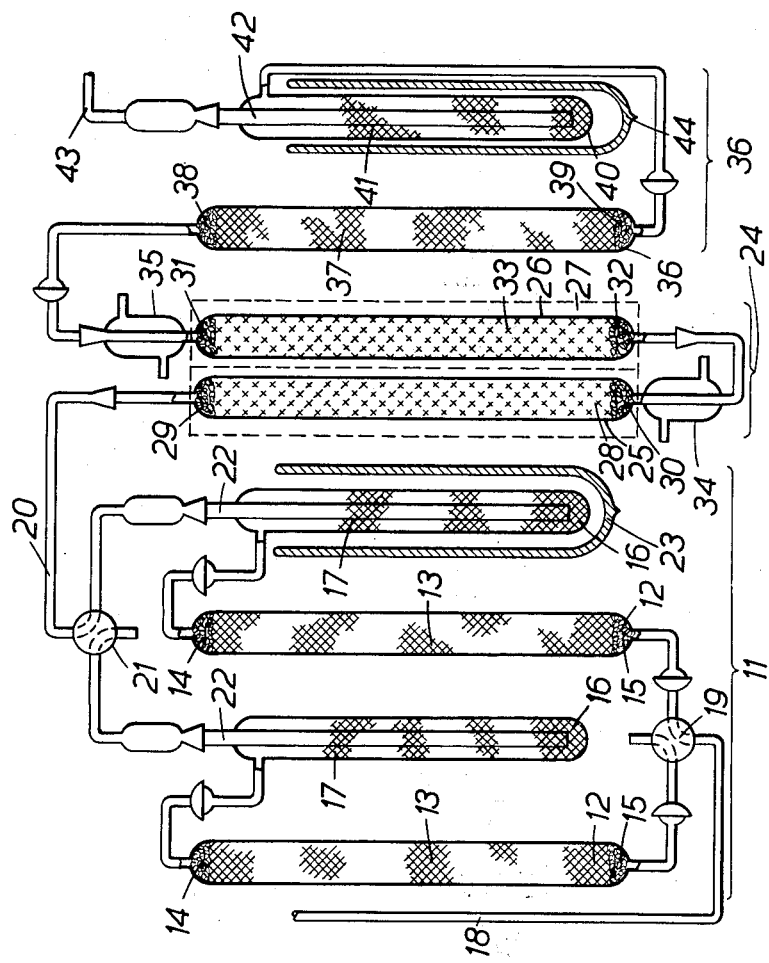

United States Patent Office 3,219,414
Patented Nov. 23, 1965

3,219,414
PURIFICATION OF HELIUM
Ronald Berry, Smithills, Bolton, England, assignor to United Kingdom Atomic Energy Authority, London, England
Filed Sept. 6, 1961, Ser. No. 136,334
Claims priority, application Great Britain, Sept. 23, 1960, 32,730/60
4 Claims. (Cl. 23—209)

The present invention relates to the purification of gaseous helium and by employing both physical and chemical purifying steps aims to provide a process yielding a product with a high degree of purity.

According to the present invention, a process for the purification of gaseous helium comprises the following sequence of treatments drying, passing through a molecular sieve at low temperature, gettering, oxidation and final extraction of moisture. The initial drying, and also the final moisture extraction, are preferably carried out by passing the gas through respective molecular sieves maintained at room temperature. For the final water extraction there may be a further molecular sieve following the sieve at room temperature, this further sieve being maintained at low temperature.

A helium purification apparatus in accordance with the invention comprises, in the order given proceeding from an inlet for the helium to be purified, a gas drying means, a molecular sieve with a cooler for cooling the sieve to a low temperature, a metal gettering means and an oxidation means with a heater for heating the gettering means and oxidation means to respective operating temperatures, and moisture extracting means.

A particular construction of helium purifying apparatus in accordance with the invention will now be described with reference to the accompanying drawing in which this construction is shown diagrammatically.

The illustrated apparatus is divisible into three stages. The first stage designated generally 11 is a primary scrubbing stage having duplicate sets of equipment each comprising a column 12 containing a molecular sieve bed 13 packed between plugs 14 and 15 of degreased steel wool and a column 16 containing a molecular sieve bed 17. An inlet 18 for the admission of helium to the primary scrubbing stage 11 includes a four-way changeover valve 19, likewise an outlet 20 leading from the scrubbing stage 11 to the second stage includes a similar valve 21. By setting the valves 19 and 21 correspondingly, either one of the two sets of columns 12 and 16 is interposed interchangeably in the helium flow path between the inlet 18 and the outlet 20, the other set of columns being vented to atmosphere. For each set of columns the lower end of the column 12 is connected to the valve 19 and the upper end to the upper end of the column 16, there being in the latter column a tube 22 which is in communication at one end with the valve 21 and which terminates at the other end close to the bottom of the column, consequently, the flow of helium through whichever of the two sets of columns as is in use at the time is upwardly through the column 12, and both downwardly and upwardly in the column 16. Further included in the primary scrubing stage 11 is a cooler 23 adapted for cooling selectively either one of the columns 16 of the two sets of columns and taking the form in the illustrated apparatus of an open-topped jacket for containing a refrigerant.

The second stage designated generally 24 comprises serially connected silica furnace tubes 25 and 26 of a furnace 27 which is capable of heating the two tubes to differing temperatures. The tube 25 contains a charge of fragmented metal getter material 28 packed between plugs 29 and 30 of degreased steel wool, such material being effective at elevated temperatures to remove in particular oxygen and nitrogen impurities, chips of titanium are preferred for this material although vanadium and calcium could be used alternatively but generally less effectively. In the tube 26 is packed between plugs 31 and 32 of degreased steel wool a charge of fragmented oxidising agent 33 which is preferably a manganese dioxide/copper oxide preparation known in the trade as Hopoalite, this preparation is in the form of pellets of $\frac{1}{16}$ inch mesh size. The outlet of each of the tubes 25 and 26 is provided externally of the furnace with a cooling section 34 or 35, as the case may be, which takes the form in the illustrated apparatus of a water-cooled jacket.

The third stage designated generally 36 is the same as one of the sets of columns in the primary scrubbing stage 11 in that it has a column 36 containing a molecular sieve bed 37 packed between plugs 38 and 39 of degreased steel wool and a second column 40 containing a molecular sieve bed 41 with a dip tube 42 communicating with an outlet 43. A cooler 44 for the column 40 takes the form, as previously, of an open-topped jacket for containing a refrigerant. The sieve beds 13, 17, 37 and 41 in the columns 21, 16, 36 and 40 are of the known type employing calcium alumino silicate pellets; the pellets are $\frac{1}{16}$ inch mesh size and a maximum pore size in the sieve material of the order of five Angstrom units is appropriate for present purposes, the commercial designation for this quality being 5A.

The apparatus is prepared for operation by preheating the column 16 (whichever of the two is intended for use) and the column 40 for several hours at a temperature between 400 and 450° C. in order to activate the molecular sieve beds contained by these two columns. They are then fitted into the coolers 23 and 44 which are filled with liquid nitrogen refrigerant to maintain the molecular sieve beds 17 and 41 at a temperature of −196° C. In the furnace, the tube 25 containing the gettering metal is heated to about 1,000° C. and the tube 26 containing the oxidising agent to about 400° C. Finally, the valves 19 and 21 are set to direct admitted helium through the prepared set of columns 12 and 16, and cold water is circulated through the jackets of the cooling sections 34 and 35.

In being passed through the apparatus, the helium is dried in the first molecular sieve of the primary scrubbing stage 11 and the bulk of the other impurities is also removed by adsorption in the second molecular sieve. Remaining traces of oxygen and nitrogen impurities are removed by the hot metal getter in the tube 25. Any hydrogen impurity remaining at this juncture, either as originally present impurity or introduced from the metal getter, is oxidised to water by the heated oxidising agent in the tube 26. The extraction of this moisture is carried out by the molecular sieve beds contained in the columns 36 and 40. The sieve bed in the column 36 is at room temperature, that is to say, about 20° C., as is also the corresponding column 12 of the primary scrubbing stage.

The effectiveness of the chemical stage, that is to say, the stage 24 with the hot metal getter and the heated oxidising agent, outlasts the effectiveness of the molecular sieve beds which are therefore duplicated in the primary scrubbing stage 11. The duplicate sets are interchanged periodically by means of the valves 19 and 21 so that the set which is out of use can be regenerated, for this purpose there is the connection made to atmosphere through the valves 19 and 21 so that, with the cooler 23 transferred to the set in use, desorption of the trapped permanent gases occurs at room temperature.

To illustrate suitable relative amounts of the materials employed in the various stages, a small apparatus adapted to purify helium at rates up to 200 ml./min. has operated successfully with 220 gm. of colcium alumino silicate sieve material, as previously referred to, in each of the columns 12 and 36, 150 gm. of titanium chips in the tube 25, and 120 gm. of Hopalite in the tube 26. This apparatus has been used to reduce the impurity content in commercially available helium gas (not less than 99.7% pure) to a degree less than 0.1 volume per million.

I claim:

1. A process for the purification of gaseous helium which comprises the steps, in the sequence given, of drying the helium, cooling a molecular sieve and passing the helium through said sieve, heating a gettering metal and contacting the helium with the heated metal, heating an oxidising agent and contacting the helium with the heated agent, and extracting moisture from the helium.

2. A process for the purification of gaseous helium which comprises the steps, in the sequence given, of passing the helium through a first molecular sieve, exposing a second molecular sieve to the cooling effect of liquid nitrogen and passing the helium through said second sieve, heating a gettering metal and contacting the helium with the heated metals, heating an oxidising agent, and contacting the helium with the heated agent, and passing the helium through a third molecular sieve.

3. A process for the purification of gaseous helium which comprises the following steps performed in the sequence as set forth: drying the helium, cooling a molecular sieve and passing the helium through said sieve, contacting the helium with a getering metal selected from the group consisting of titanium, calcium and vanadium at an elevated temperatiure effective for the removal of residual traces of oxygen and notrogen, oxidizing residual hydrogen in the helium by contact with an oxidizing agent in the form of heated metal oxide, and extracting moisture from the helium.

4. A process for the purification of gaseous helium which comprises the following steps performed in the sequence as set forth: passing the helium thorugh a first molecular sieve of type 5A calcium alumino silicate, passing the helium through a second molecular sieve of the same type but exposed to the cooling effect of liquid nitrogen, contacting the helium with a gettering material selected from the group consisting of titanium, calcium and vanadium at an elevated temperature effective for the removal of residual traces of oxygen and nitrogen, oxidizing residual hydrogen in the helium by contact with an oxidizing agent in the form of heated metal oxide, and extracting moisture from the helium by passage through third and fourth molecular sieves, both said third and fourth sieves being of type 5A calcium alumino silicate and the latter being exposed to the cooling effect of notrogen.

References Cited by the Examiner

UNITED STATES PATENTS

| | | | |
|---|---|---|---|
| 1,478,036 | 12/1923 | Jones | 23—209 |
| 1,906,917 | 5/1933 | Peters et al. | 23—209X |
| 2,204,501 | 6/1940 | Krauss | 23—209X |
| 2,882,243 | 4/1959 | Milton | 23—113 |
| 3,012,853 | 12/1961 | Milton | 23—113 |
| 3,061,403 | 10/1962 | Rendos | 23—209X |

FOREIGN PATENTS 809,168  2/1959  Great Britain.

MAURICE A. BRINDISI, *Primary Examiner.*